US009707635B2

(12) United States Patent
Itoi (10) Patent No.: US 9,707,635 B2
(45) Date of Patent: Jul. 18, 2017

(54) METHOD FOR SLICING WORKPIECE AND WIRE SAW (75) Inventor: Yukio Itoi, Nishishirakawa (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 275 days.

(21) Appl. No.: 14/241,952

(22) PCT Filed: Aug. 29, 2012

(86) PCT No.: PCT/JP2012/005419
§ 371 (c)(1),
(2), (4) Date: Feb. 28, 2014

(87) PCT Pub. No.: WO2013/051183
PCT Pub. Date: Apr. 11, 2013

(65) Prior Publication Data
US 2014/0216222 A1 Aug. 7, 2014

(30) Foreign Application Priority Data
Oct. 4, 2011 (JP) ................................. 2011-220093

(51) Int. Cl.
B23D 61/18 (2006.01)
B23D 57/00 (2006.01)
B24B 27/06 (2006.01)

(52) U.S. Cl.
CPC ....... B23D 61/185 (2013.01); B23D 57/0053 (2013.01); B24B 27/0633 (2013.01); Y10T 83/04 (2015.04); Y10T 83/9292 (2015.04)

(58) Field of Classification Search
CPC .............. B23D 57/007; B23D 57/0023; B23D 57/0053; B23D 57/0061; B23D 57/0007;
(Continued)

(56) References Cited

U.S. PATENT DOCUMENTS 3,194,099 A * 7/1965 Palter ....................... B26D 5/22
83/156
3,400,494 A 9/1968 Seitz
(Continued)

FOREIGN PATENT DOCUMENTS

CN 101618519 A 1/2010
CN 101678563 A 3/2010
(Continued)

OTHER PUBLICATIONS

Nov. 26, 2015 Search Report issued in Taiwanese Patent Application No. 101134143.
(Continued)

Primary Examiner — Kenneth E Peterson
(74) Attorney, Agent, or Firm — Oliff PLC (57) ABSTRACT A method for slicing a workpiece into wafers by imparting axial reciprocating motion to a wire wound around a plurality of grooved rollers, and moving the workpiece relatively downwardly to press the workpiece against the reciprocating wire and feed the workpiece with the workpiece cut into while supplying a slurry to the wire, the method including the steps of: configuring each of the grooved rollers such that a distance from a bottom of grooves of the grooved roller to a rotating shaft of the grooved roller decreases gradually from a wire-supply side toward a wire-collection side; slicing the workpiece in such a manner that the workpiece is pressed against the wire on the wire-supply side before the workpiece is pressed against the wire on the wire-collection side.

2 Claims, 5 Drawing Sheets (58) Field of Classification Search
CPC .. B23D 61/185; B26D 61/185; B26D 61/547;
B26D 61/553; B26D 1/547; B26D 1/553;
B24B 27/0633
USPC .................................. 83/651.1, 622; 125/21
See application file for complete search history.

(56) References Cited

U.S. PATENT DOCUMENTS

| | | | | |
|---|---|---|---|---|
| 3,774,490 | A * | 11/1973 | Gerson | B26D 1/553 83/425.3 |
| 5,201,305 | A * | 4/1993 | Takeuchi | B28D 1/025 125/16.01 |
| 6,371,101 | B1 * | 4/2002 | Hauser | B23D 57/0023 125/16.01 |
| 9,333,673 | B2 * | 5/2016 | Pietsch | B23D 57/0023 |
| 2010/0163010 | A1 | 7/2010 | Kitagawa | |
| 2011/0126813 | A1 * | 6/2011 | Hodsden | B23D 57/0053 125/16.02 |
| 2014/0311472 | A1 * | 10/2014 | Tian | B23D 61/185 125/21 |

FOREIGN PATENT DOCUMENTS

| | | | |
|---|---|---|---|
| EP | 2 347 845 | A1 | 7/2011 |
| JP | 54-112084 | * | 9/1979 |
| JP | A-58-8558 | | 1/1983 |
| JP | H02-292165 | A | 12/1990 |
| JP | A-10-249701 | | 9/1998 |
| JP | H11-138412 | A | 5/1999 |
| JP | A-2000-5999 | | 1/2000 |
| JP | A-2008-100298 | | 5/2008 |
| JP | A-2010-110865 | | 5/2010 |
| TW | 201016416 | A | 5/2010 |
| TW | 201105475 | A | 2/2011 |

OTHER PUBLICATIONS

Jul. 30, 2015 Search Report issued in Chinese Patent Application No. 2012800453405.
International Search Report issued in International Patent Application No. PCT/JP2012/005419 dated Dec. 4, 2012.

* cited by examiner

RECIPROCATING MOTION OF WIRE

METHOD FOR SLICING WORKPIECE AND WIRE SAW

TECHNICAL FIELD

The present invention relates to a method for slicing a workpiece into wafers by using a wire saw and to a wire saw.

BACKGROUND ART

There has been conventionally known a wire saw as a means for slicing a workpiece, such as a silicon ingot and a compound semiconductor ingot, into wafers. In a wire saw, a wire row is defined by winding a wire around a plurality of rollers many times, the wire is driven in its axial direction at a high speed, a workpiece is fed toward the wire row to cut the workpiece while a slurry is appropriately supplied, and the workpiece is thereby sliced at the respective wire positions at the same time.

Figure 8:
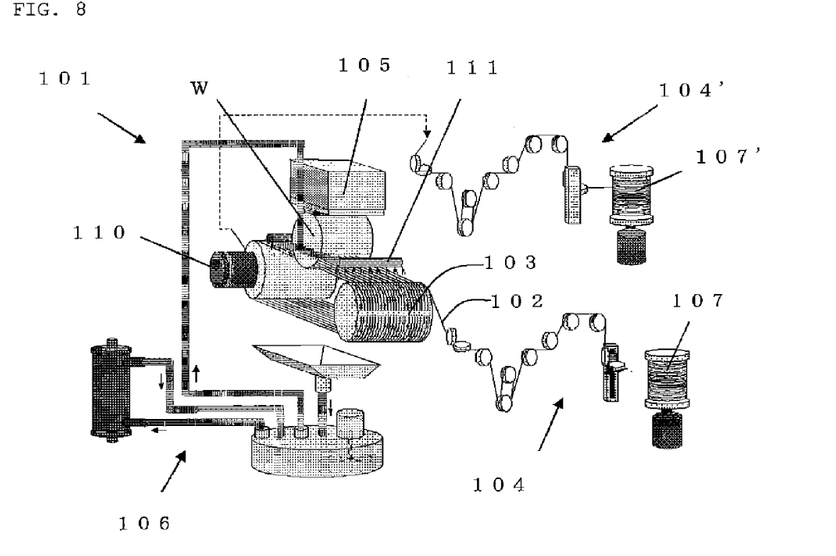
FIG. 8 is a schematic view of an example of a conventional wire saw.

Here, FIG. 8 shows an outline of an example of a conventional wire saw.

As shown in FIG. 8, a wire saw 101 is mainly constituted of a wire 102 configured to slice a workpiece, grooved rollers 103 around which the wire 102 is wound, mechanisms 104 and 104' configured to give the wire 102 a tension, a means 105 for feeding the workpiece downwardly, and a means 106 for supplying a slurry at the time of slicing.

The wire 102 is reeled out from one wire reel 107 and enters the grooved rollers 103 after passing through a tensile-force-applying mechanism 104 that includes a powder clutch (a constant torque motor) and a dancer roller (a deadweight), not shown, via a traverser. The wire 102 is wound around the grooved rollers 103 about 300 to 400 times to define a wire row. The wire 102 is rolled up around the other wire reel 107' after passing through the other wire-tension-applying mechanism 104'.

The grooved roller 103 are rollers, each being formed by press-fitting polyurethane resin around a steel cylinder and then cutting grooves on the surface thereof. With a drive motor 110, the grooved rollers 103 allow reciprocating motion for a predetermined travel distance to be imparted to the wound wire 102. At this time, a travel distance in one reciprocating direction of the wire differs from one in the other reciprocating direction, i.e., a travel distance in one reciprocating direction is longer than one in the other reciprocating direction. A new line of the wire is supplied in a direction along which the wire travels for a long distance, as the reciprocating motion of the wire continues.

The workpiece feeding means 105, at the time of slicing the workpiece, can hold the workpiece and move downwardly the held workpiece to feed the workpiece toward the wire 102 wound around the grooved rollers 103.

Furthermore, nozzles 111 are provided near the grooved rollers 103 and the wound wire 102, enabling a slurry having an adjusted temperature to be supplied from the slurry supplying means 106 to the wire 102.

Such a wire saw 101 applies an appropriate tension to the wire 102 with the tensile-force-applying mechanism 104, and presses the workpiece held with the workpiece feeding means 105 against the reciprocating wire with the workpiece cut into while imparting reciprocating motion to the wire 102 with the drive motor 110, whereby the workpiece is sliced.

At this time, as described above, the new line of the wire is supplied as the reciprocating motion of the wire continues. Accordingly, the wire on a side to which the new line of the wire wound around the grooved roller 103 is supplied (referred to as a wire-supply side) is worn away more strongly as compared with a side to which the wire is collected (referred to as a wire-collection side), and hence reduces in its diameter. Wafers sliced on the wire-collection side therefore tend to have a larger thickness than that of wafers sliced on the wire-supply side. There has thus been a problem in that the thickness of wafers sliced from a workpiece varies.

As regards this problem, there has been used a method for suppressing the variation in wafer thickness by using a grooved roller configured to make pitches between its grooves narrower from the wire-supply side toward the wire-collection side (see Patent Document 1, for example).

CITATION LIST

Patent Literature

Patent Document 1: Japanese Unexamined Patent Application Publication No. H10-249701

SUMMARY OF INVENTION

Technical Problem

Slicing a workpiece in such a manner, unfortunately, arises a problem in that the wafer thickness at the beginning of slicing the workpiece becomes thinner than that at the central portion, particularly at the wire-collection side, to which the pitches between grooves are narrower, making total thickness variation (TTV) of the sliced wafers worse.

In view of the above-described problem, it is an object of the present invention to provide a method for slicing a workpiece and a wire saw that can prevent the wafer thickness at the beginning of slicing a workpiece from locally becoming thinner particularly at the wire-collection side, to which the pitches between grooves are narrower, and also TTV from becoming worse, at the time of slicing the workpiece by the wire saw.

Solution to Problem

To achieve this object, the present invention provide a method for slicing a workpiece into wafers by imparting axial reciprocating motion to a wire wound around a plurality of grooved rollers, and moving the workpiece relatively downwardly to press the workpiece against the reciprocating wire and to feed the workpiece with the workpiece cut into while supplying a slurry to the wire, the method comprising the steps of: configuring each of the grooved rollers such that a distance from a bottom of grooves of the grooved roller to a rotating shaft of the grooved roller decreases gradually from a wire-supply side toward a wire-collection side; slicing the workpiece in such a manner that the workpiece is pressed against the wire on the wire-supply side before the workpiece is pressed against the wire on the wire-collection side.

Such a method for slicing a workpiece can prevent the workpiece from being sliced with an unworn line of the wire at the wire-collection side, to which the pitches between grooves are narrower, and suppress the wafer thickness at the beginning of slicing the workpiece from locally becoming thinner particularly at the wire-collection side, thereby improving the TTV.

At this time, a maximum difference in the distance from the bottom of grooves of the grooved roller to a rotating shaft of the grooved roller preferably ranges from 1 mm to 5 mm.

When the maximum difference is 1 mm or more, the wafer thickness at the beginning of slicing the workpiece can surely be suppressed from locally becoming thinner particularly at the wire-collection side. When the maximum difference is 5 mm or less, grooves can be formed in the grooved roller within the range of the thickness of a resin shell, such as polyurethane, formed around the grooved roller, and a residual thickness can be held in the shell to re-form the grooves, and hence grooving can be readily performed at a low cost.

In the configuring step, the grooved roller may be configured such that the grooved roller has a constant diameter and a depth of the grooves increases gradually from the wire-supply side toward the wire-collection side.

In this a manner, forming grooves each having different depths simply enables the configuration of the grooved roller such that the distance from the bottom of grooves of the grooved roller to a rotating shaft of the grooved roller decreases gradually from the wire-supply side toward the wire-collection side.

In the configuring step, alternatively, the grooved roller may be configured such that the grooves have a constant depth and a diameter of the grooved roller decreases gradually from the wire-supply side toward the wire-collection side.

In this a manner, the grooves can readily be formed to configure the grooved roller. The grooving can be more readily performed by forming V-shaped grooves.

Furthermore, the present invention provides a wire saw comprising: a wire wound around a plurality of grooved rollers, the wire being configured to be capable of axial reciprocating motion; a nozzle for supplying a slurry to the wire; a workpiece feeding means configured to hold a workpiece and to move relatively downwardly the held workpiece to feed the workpiece toward the wire; the wire saw being configured to slice the workpiece into wafers by pressing the workpiece held by the workpiece feeding means against the reciprocating wire and feeding the workpiece with the workpiece cut into while supplying a slurry to the wire through the nozzle, wherein each of the grooved rollers is configured such that a distance from a bottom of grooves of the grooved roller to a rotating shaft of the grooved roller decreases gradually from a wire-supply side toward a wire-collection side, and the wire saw being capable of slicing the workpiece in such a manner that the workpiece is pressed against the wire on the wire-supply side before the workpiece is pressed against the wire on the wire-collection side.

Such a wire saw can prevent the workpiece from being sliced with an unworn line of the wire at the wire-collection side, to which the pitches between grooves are narrower, and suppress the wafer thickness at the beginning of slicing the workpiece from locally becoming thinner particularly at the wire-collection side, thereby improving the TTV.

In the wire saw, the maximum difference in the distance from the bottom of grooves of the grooved roller to a rotating shaft of the grooved roller preferably ranges from 1 mm to 5 mm.

When the maximum difference is 1 mm or more, the workpiece can surely be prevented from being sliced with an unworn line of the wire at the wire-collection side, and the TTV can surely be improved. When the maximum difference is 5 mm or less, grooves can be formed in the grooved roller within the range of the thickness of a resin shell, such as polyurethane, formed around the grooved roller, and a residual thickness can be held in the shell to re-form the grooves, and hence grooving can be readily performed at a low cost.

The grooved roller may be configured such that the grooved roller has a constant diameter and a depth of the grooves increases gradually from the wire-supply side toward the wire-collection side.

In such a wire saw, forming grooves each having different depths simply enables the configuration of the grooved roller such that the distance from the bottom of grooves of the grooved roller to a rotating shaft of the grooved roller decreases gradually from the wire-supply side toward the wire-collection side.

Alternatively, the grooved roller may be configured such that the grooves have a constant depth and a diameter of the grooved roller decreases gradually from the wire-supply side toward the wire-collection side.

In such a wire saw, the grooves of the grooved roller can readily be formed. The grooving can be more readily performed by forming V-shaped grooves.

Advantageous Effects of Invention

The inventive method for slicing a workpiece with the wire saw of the present invention involves: configuring each grooved roller such that the distance from the bottom of grooves of the grooved roller to a rotating shaft of the grooved roller decreases gradually from the wire-supply side toward the wire-collection side; and slicing the workpiece in such a manner that the workpiece is pressed against the wire on the wire-supply side before the workpiece is pressed against the wire on the wire-collection side. The workpiece, therefore, can be prevented from being sliced with an unworn line of the wire at the wire-collection side to which the pitches between grooves are narrower and the wafer thickness at the beginning of slicing the workpiece can be suppressed from locally becoming thinner particularly at the wire-collection side so that the TTV is improved. These advantageous effects result in a smaller stock removal in a post-process such as a lapping process and a polishing process. The present invention thus enables the thickness of sliced wafers to be thinner to reduce kerf loss, thereby improving productivity of the post-process such as the lapping process and the polishing process.

DESCRIPTION OF EMBODIMENTS

Although embodiments of present invention will now be described, the present invention is not restricted thereto.

As described above, when a workpiece such as a silicon ingot is sliced by using a conventional wire saw having a grooved roller whose groove pitch is varied in consideration for wire abrasion to uniform the thickness of sliced wafers, the thickness of the wafers disadvantageously becomes locally thinner at the beginning of slicing, where the wire abrasion has not advanced yet. This phenomenon particularly becomes prominent at the wire-collection side, to which the pitches between grooves are narrower.

The present inventors repeatedly keenly conducted examinations to solve such a problem, and conceived that the wafer thickness at the beginning of slicing, where the wire abrasion has not advanced yet, can be suppressed from locally becoming thinner by changing timing of contact of the workpiece with the wire between the wire-supply side and the wire-collection side at the start of slicing, more specifically, by delaying contact of the workpiece with the wire on the wire-supply side, thereby bringing the present invention to completion.

Figure 1:
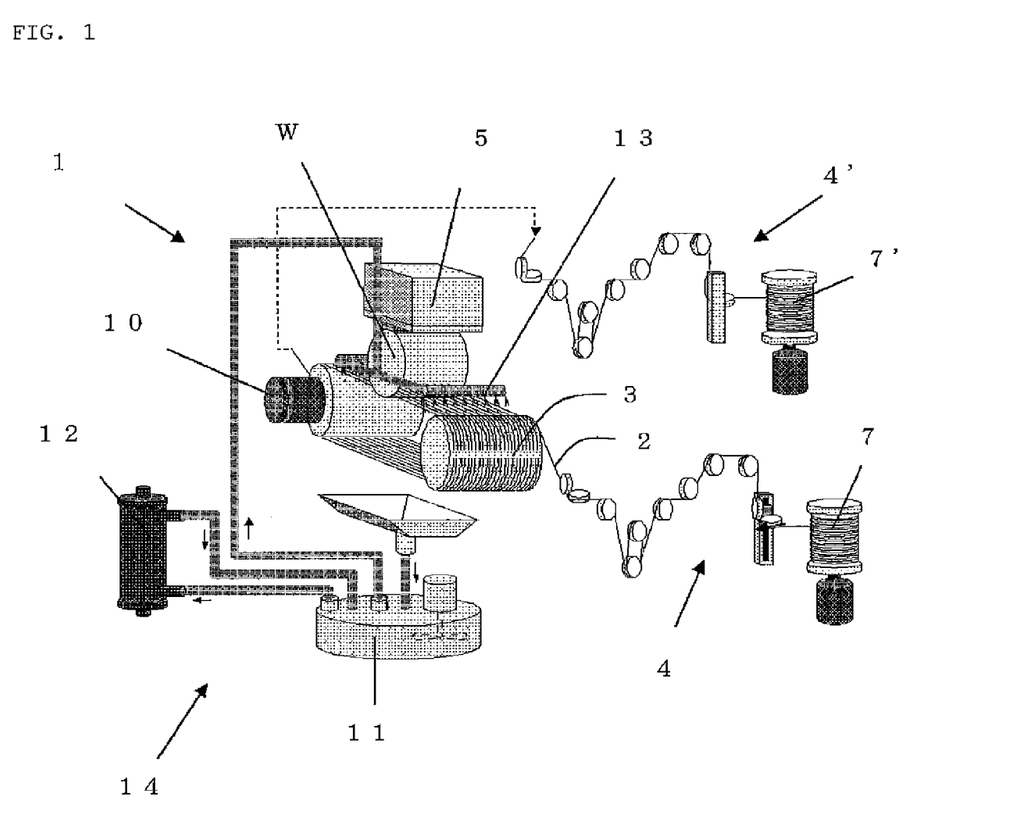
FIG. 1 is a schematic view of an example of a wire saw according to the present invention.

FIG. 1 is a schematic view of an example of a wire saw according to the present invention.

As shown in FIG. 1, a wire saw 1 of the present invention is mainly constituted of a wire 2 configured to slice a workpiece W, grooved rollers 3, tensile-force-applying mechanisms 4 and 4' configured to apply a tension to the wire 2, a workpiece feeding means 5 configured to hold a workpiece W being sliced into wafers and to move relatively downwardly the held workpiece to feed the workpiece with the workpiece cut into, and a slurry supplying means 14 configured to supply a slurry to the wire 2 at the time of slicing.

The wire 2 is reeled out from one wire reel 7 and enters the grooved rollers 3 through a traverser after passing through the wire-tension-applying mechanism 4 including a powder clutch (a constant torque motor), and a dancer roller (a deadweight). The wire 2 is wound around a plurality of grooved rollers 3 about 300 to 400 times, whereby a wire row are formed. The wire 2 is rolled up around a wire reel 7' after passing through the other wire-tension-applying mechanism 4'.

The slurry supplying means 14 includes a slurry tank 11, a slurry chiller 12, and a nozzle 13. The nozzle 13 is disposed above the wire 2 wound around the grooved rollers 3. The nozzle 13 is connected to the slurry tank 11, and the slurry can be supplied to the wire 2 out of the nozzle 13 after the supply temperature of the slurry is controlled by the slurry chiller 12.

Here, the type of the slurry used in slicing is not limited to a particular type, and slurry similar to existing slurry can be used; for example, slurry obtained by dispersing silicon carbide abrasive grains in liquid can be used.

The grooved rollers 3 are rollers, each being formed by press-fitting polyurethane resin around a steel cylinder and then cutting grooves on the surface thereof at regular intervals. With a drive motor 10, the grooved rollers 3 allow reciprocating motion in the direction of a wire axis to be imparted to the wound wire 2. In the reciprocating motion of the wire 2, the traveling distances of the wire 2 in the respective reciprocating directions differ, and the traveling distance in one direction is longer than that in the other direction so that a new line of the wire can be supplied. The new line is thus supplied in the direction of the longer traveling distance as the reciprocating motion of the wire continues.

Figure 2A:
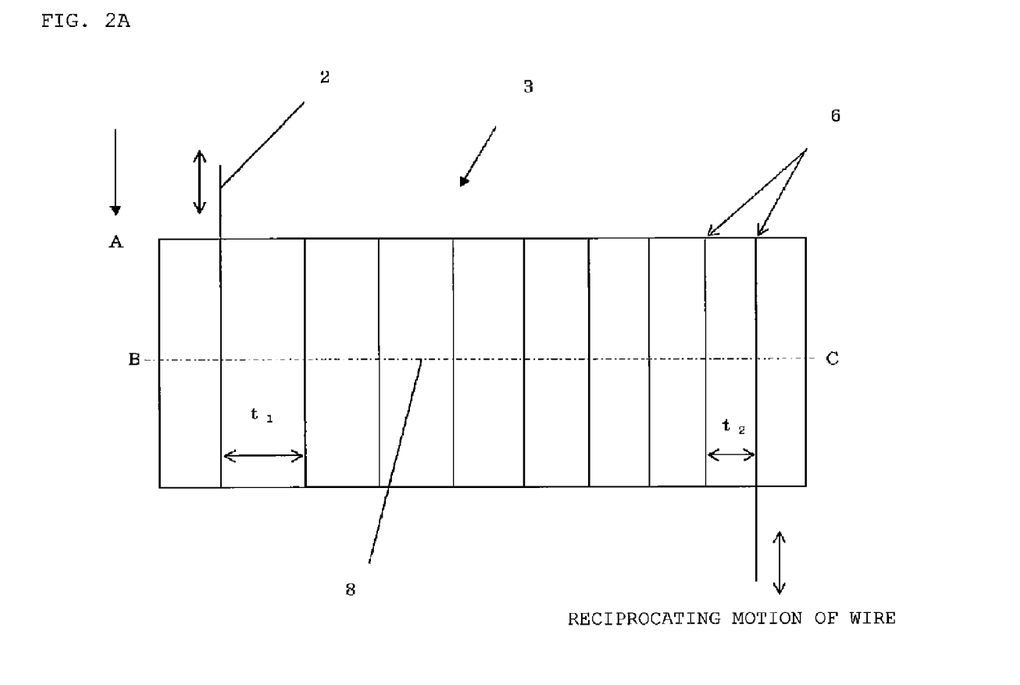
FIG. 2A is a schematic top view of a grooved roller of a wire saw according to the present invention.

As shown in FIG. 2A, the wire-supply side is represented by "B" shown in FIG. 2A, and the wire-collection side is represented by "C", wherein the new line is supplied in an "A" direction, for example.

As shown in FIG. 2A, the grooves 6 of the grooved roller 3 are formed in such a manner that the pitch between the grooves on the wire-collection side C becomes narrower than that on the wire-supply side B ($t_1 > t_2$).

Figure 2B:
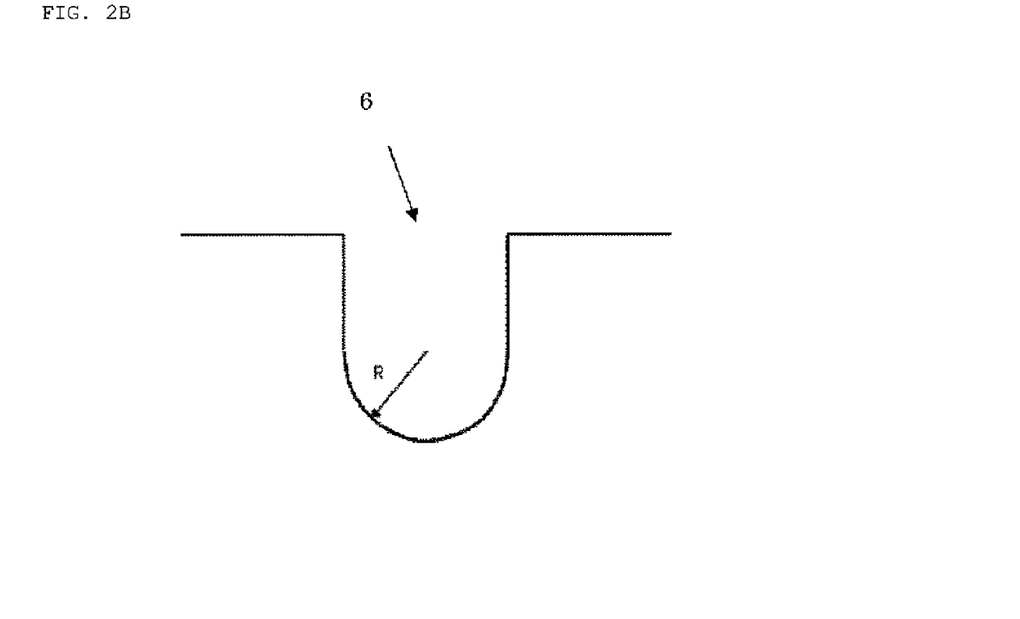
FIG. 2B is a schematic view of an exemplary groove of a grooved roller of a wire saw according to the present invention.

Moreover, the grooved roller of the inventive wire saw is configured such that the distance from the bottom of grooves of the grooved roller to a rotating shaft of the grooved roller decreases gradually from the wire-supply side toward the wire-collection side. In other word, height positions of the wire, wound around this grooved roller, on the side facing the workpiece are gradually lowered from the wire-supply side toward the wire-collection side. Here, the grooves of the grooved roller are preferably formed into a U-shape having the same R shape and the same groove width as the diameter of the wire as shown in FIG. 2B to avoid transverse oscillation of the wire.

When the workpiece W is sliced, the workpiece W is fed toward the wire 2, located relatively below the workpiece, by the workpiece feeding means 5. The workpiece feeding means 5 presses the workpiece W against the reciprocating wire 2 and feeds the workpiece W with the workpiece cut into by moving the workpiece W relatively downwardly. In the invention, at this time, the workpiece is pressed against the wire on the wire-supply side before the workpiece is pressed against the wire on the wire-collection side. The workpiece feeding means 5 can feed the held workpiece W at a programmed feeding speed under computer control. Then, after completing the slicing of the workpiece W, the workpiece feeding means 5 pulls the sliced workpiece W from the wire row by reversing the direction in which the workpiece W is fed.

The wire saw of the present invention delays the timing of contact of the workpiece with the wire on the wire-collection side, to which the pitches between grooves are narrower, at the start of slicing as compared with the wire on the wire-supply side, thereby preventing the workpiece from being sliced with an unworn line of the wire at the wire-collection side. The wire saw can therefore suppress the wafer thickness at the beginning of slicing the workpiece from becoming thinner than that at the central portion, particularly at the wire-collection side, thereby improving the TTV.

Figure 3:
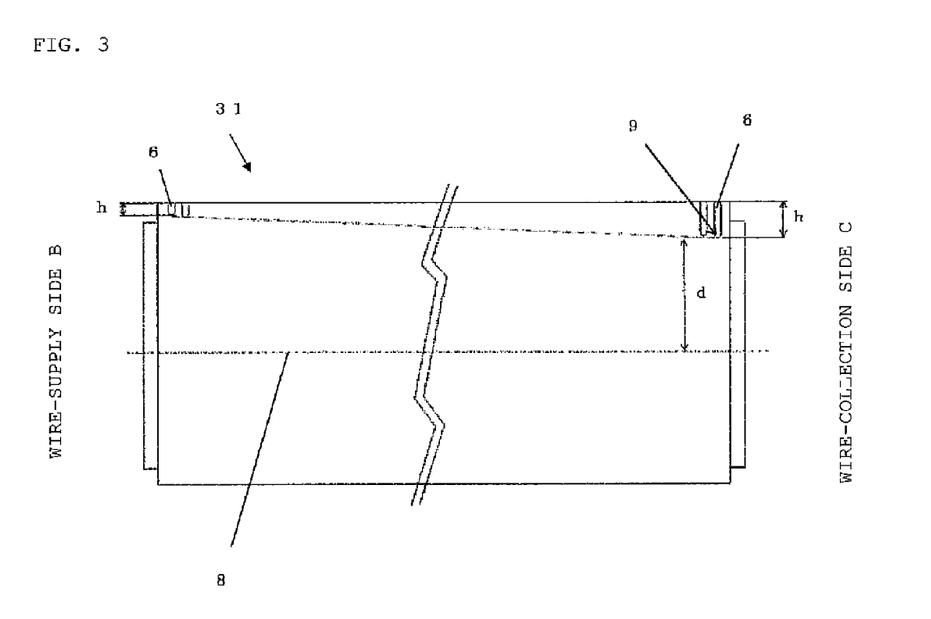
FIG. 3 is a schematic view of an exemplary grooved roller of a wire saw according to the present invention.

FIG. 3 shows an outline of an exemplary grooved roller of a wire saw of the present invention.

As shown in FIG. 3, the grooved roller 31 has a constant diameter over its length and the depth ("h" in FIG. 3) of the grooves 6 of the grooved roller 31 increases gradually from the wire-supply side toward the wire-collection side (a slant line in FIG. 3). It is to be noted that FIG. 3 shows only the respective two grooves from both ends of the grooved roller, and omits other grooves. The distance ("d" in FIG. 3) from the bottom 9 of the grooves 6 of the grooved roller 31 to a rotating shaft 8 of the grooved roller 31 decreases gradually from the wire-supply side B toward the wire-collection side C. This grooved roller 31 can be readily configured by merely forming grooves with different depths with existing equipment. In this case, each of the grooves is preferably a U-shaped groove, which can be prevented from interfering with adjacent grooves, particularly at the wire-collection side on which the grooves are formed more deeply.

Figure 4:
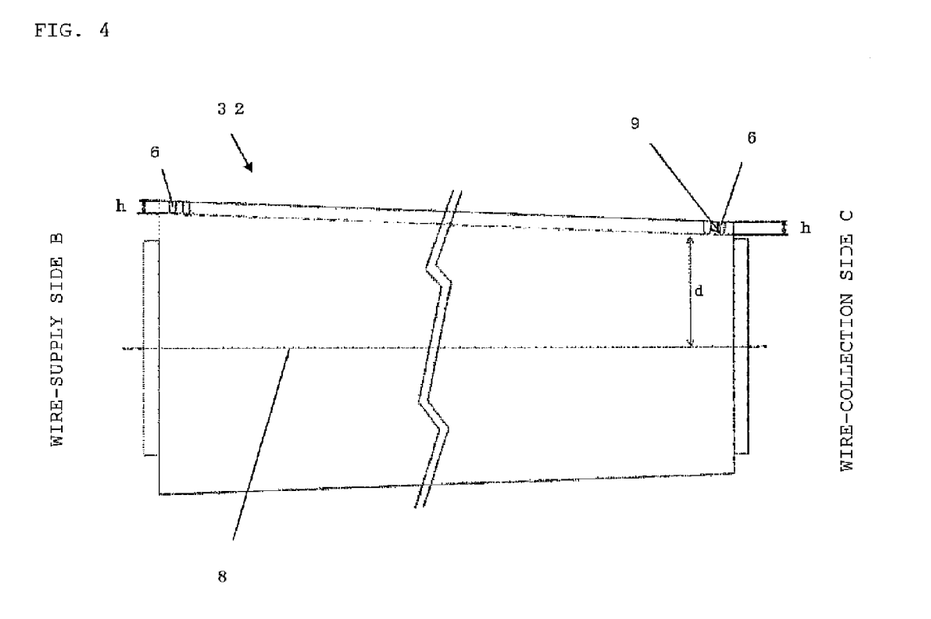
FIG. 4 is a schematic view of an exemplary grooved roller of a wire saw according to the present invention.

As shown in FIG. 4, the grooved roller 32 may alternatively be configured such that all the grooves 6 have a constant depth and the diameter of the grooved roller 32 decreases gradually from the wire-supply side B toward the wire-collection side C.

In this grooved roller 32, likewise, the distance d from the bottom 9 of the grooves 6 to the rotating shaft 8 of the grooved roller 32 decreases gradually from the wire-supply side B toward the wire-collection side C. The grooves of the grooved roller 32 can be readily formed. In this grooved roller, each of the grooves is also preferably formed into a U-shaped, or may alternatively be formed into a V-shape, since all the grooves have the same depth h. The V-shaped grooves can be more readily formed.

The maximum difference in the distance from the bottom of the grooves of the grooved roller to the rotating shaft of the grooved roller may be determined according to the diameter of the grooved roller, how many times the wire being wound around the grooved roller, and the thickness of wafers being sliced, and preferably ranges from 1 mm to 5 mm.

When the maximum difference is 1 mm or more, the workpiece can surely be prevented from being sliced with an unworn line of the wire at the wire-collection side, and the TTV can surely be improved. When the maximum difference is 5 mm or less, the grooves can be formed in the grooved roller within the range of the thickness of a resin shell, such as polyurethane, formed around the grooved roller. Moreover, re-forming the grooves, in this case, does not necessitate re-forming the resin shell, and the grooves can be re-formed after removing a region of the resin shell where the grooves are formed. More specifically, the grooves-forming process can be performed two times within the thickness range of a commonly used resin shell and hence the cost can be reduced.

A method for slicing a workpiece of the present invention will now be described. Here, a case where such a wire saw 1 as shown in FIG. 1 will be described.

First the grooved rollers 3 are prepared, each of which is configured such that the distance from the bottom of grooves of the grooved roller 3 to the rotating shaft of the grooved roller 3 decreases gradually from the wire-supply side toward the wire-collection side.

The prepared grooved roller at this time may be the grooved roller 31, as shown in FIG. 3, each of which is configured such that the grooved roller has a constant diameter and the depth of the grooves 6 increases gradually from the wire-supply side toward the wire-collection side.

In this manner, forming grooves each having different depths with existing equipment simply enables preparation of such a grooved roller, configured such that the distance from the bottom of the grooves of the grooved roller to the rotating shaft of the grooved roller decreases gradually from the wire-supply side toward the wire-collection side. In this case, each of the grooves is preferably a U-shaped groove, which can be prevented from interfering with adjacent grooves, particularly at the wire-collection side on which the grooves are formed more deeply.

Alternatively, the prepared grooved roller may be the grooved roller 32, as shown in FIG. 4, each of which is configured such that the grooves 6 have a constant depth and the diameter of the grooved roller decreases gradually from the wire-supply side toward the wire-collection side.

In such a manner, the grooves can readily be formed to prepare the grooved roller. In this grooved roller, each of the grooves is also preferably formed into a U-shaped, or may alternatively be formed into a V-shape, which can be more readily formed.

Next the workpiece W is held with the workpiece feeding means 5.

The wire 2 is then cause to reciprocate in its axial direction with a tension applied to the wire. The workpiece W is moved relatively downwardly with the workpiece feeding means 5 to feed the workpiece W to the wire row with the workpiece cut into while a slicing slurry is supplied to the wire 2 with the slurry supplying means 14, so that the workpiece W is sliced. At this time, the workpiece is pressed against the wire on the wire-supply side before the workpiece is pressed against the wire on the wire-collection side.

The slicing method of the present invention delays the timing of contact of the workpiece with the wire on the wire-collection side, to which the pitches between grooves are narrower, at the start of slicing as compared with the wire on the wire-supply side, thereby preventing the workpiece from being sliced with an unworn line of the wire at the wire-collection side. The method can therefore suppress the wafer thickness at the beginning of slicing the workpiece from becoming thinner than that at the central portion, particularly at the wire-collection side, thereby improving the TTV.

The maximum difference in the distance from the bottom of the grooves of the grooved roller to the rotating shaft of the grooved roller may be determined according to the diameter of the grooved roller, how many times the wire being wound around the grooved roller, and the thickness of wafers being sliced, and preferably ranges from 1 mm to 5 mm.

When the maximum difference is 1 mm or more, the workpiece can surely be prevented from being sliced with an unworn line of the wire at the wire-collection side, and the TTV can surely be improved. When the maximum difference is 5 mm or less, the grooves can be formed in the grooved roller within the range of the thickness of a resin shell, such as polyurethane, formed around the grooved roller. Moreover, re-forming the grooves, in this case, does not necessitate re-forming the resin shell, and the grooves can be re-formed after removing a region of the resin shell where the grooves are formed. More specifically, the grooves-forming process can be performed two times within the thickness range of a commonly used resin shell and hence the cost can be reduced.

In the above embodiments, the workpiece is moved downwardly with the workpiece feeding means of the wire saw shown in FIG. 1. The method for slicing a workpiece and the wire saw of the present invention however are not restricted thereto, as long as the workpiece is fed by being moved relatively downwardly. More specifically, the workpiece W may be fed by moving the wire row upwardly, instead of feeding the workpiece W downwardly.

Here, the tension being applied to the wire 2, and the traveling speed of the wire 2 may be appropriately determined. The traveling speed of the wire may be 400 to 800 m/min, for example. The feeding speed at which the workpiece is fed to the wire row may be 0.2 to 0.4 mm/min, for example. These conditions are not restricted thereto.

Examples of the slurry supplied to the wire 2 at the time of slicing include, but is not limited to, a mixture of a coolant and #2000 abrasive grains, and an exemplary ratio of the coolant and abrasive grains is 50:50 by weight. The temperature of the slurry may be 15° C. to 30° C., for example.

As described above, according to the present invention, the wafer thickness at the beginning of slicing the workpiece can be suppressed from locally becoming thinner particularly at the wire-collection side, to which the pitches between grooves are narrower, so that the TTV is improved.

These advantageous effects result in a smaller stock removal in a post-process such as a lapping process and a polishing process. The present invention thus enables the thickness of sliced wafers to be thinner to reduce kerf loss, thereby improving productivity of the post-process such as the lapping process and the polishing process.

EXAMPLES

The present invention will now be more specifically described with reference to an example and a comparative example, but the present invention is not restricted to this example.

Example

A workpiece was sliced with the inventive wire saw, as shown in FIG. 1, having the grooved roller, as shown in FIG. 3, according to the inventive method for slicing a workpiece, and the TTV of sliced wafers was evaluated. Here, a silicon ingot having a diameter of 300 mm and a length of 400 mm was used as the workpiece. The minimum depth of the grooves was 0.25 mm, the maximum depth thereof was 2 mm, and the maximum difference in the distance from the position of the bottom of the grooves of the grooved roller to the rotating shaft of the grooved roller was 1.75 mm. As shown in FIG. 2A, the pitch between the grooves was gradually narrowed by 1 μm every 10 stages, wherein $t_1$=1.08 mm and $t_2$=1.07 mm. As shown in FIG. 2B, the grooves were formed into a U-shape with the same R shape and the same groove width as those of a 0.14-mm-diameter wire.

Figure 5:
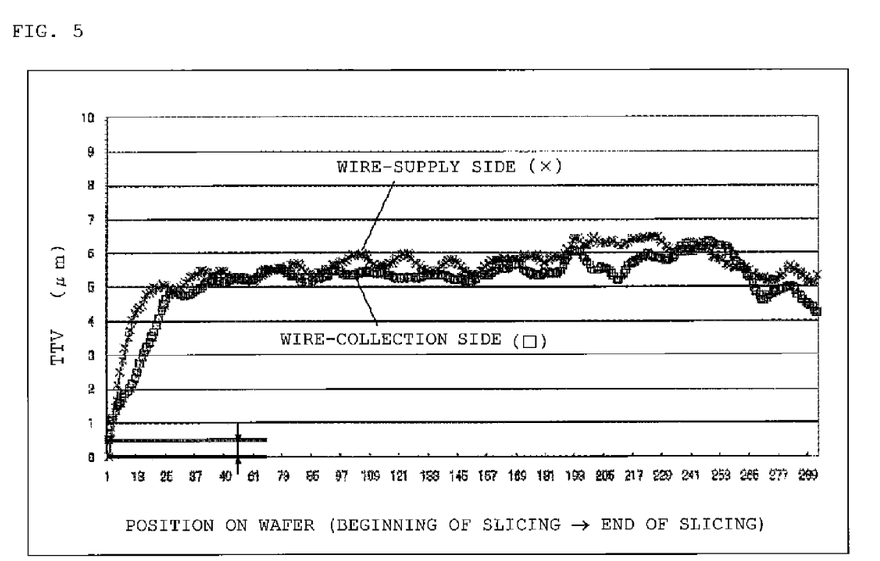
FIG. 5 shows a thickness distribution of a wafer in Example.

FIG. 5 shows a thickness distribution of a sliced wafer in a slicing direction. As shown in FIG. 5, there was almost no difference in thickness at the beginning of slicing between the wire-supply side and the wire-collection side. It was revealed that the variation in the thickness was improved as compared with the result of the later-described Comparative Example shown in FIG. 6.

Figure 7:
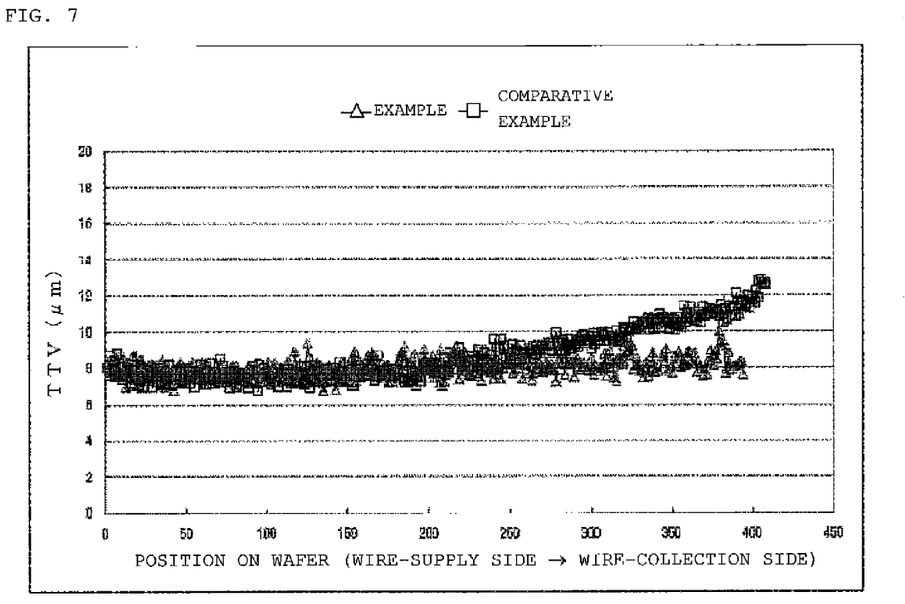
FIG. 7 shows a result of total thickness variation in each of Example and Comparative Example.

FIG. 7 shows a result of the TTV. As shown in FIG. 7, the average of the TTV was 8.0 μm and the variance in the TTV was 0.3 μm, which were greatly improved as compared with an average of 8.7 μm and a variance of 2.0 μm in the later-described Comparative Example. It is to be noted that SBW-330 manufactured by Kobelco Research Institute was used as a measuring instrument.

The case where the grooved roller as shown in FIG. 4 was used obtained the same result as above.

It was thus confirmed that the wire saw and the method for slicing a workpiece of the present invention can prevent the wafer thickness at the beginning of slicing a workpiece from locally becoming thinner particularly at the wire-collection side, to which the pitches between grooves are narrower, and also the TTV from becoming worse, at the time of slicing the workpiece by the wire saw.

Comparative Example

A silicon ingot was sliced under the same conditions as Example except for using a conventional wire saw, as shown in FIG. 8, including a grooved roller having a constant diameter over its length and grooves with a constant depth and pressing a workpiece against a wire both on the wire supply side and the wire-collection side at the same time, and the same evaluation was carried out as with Example.

Figure 6:
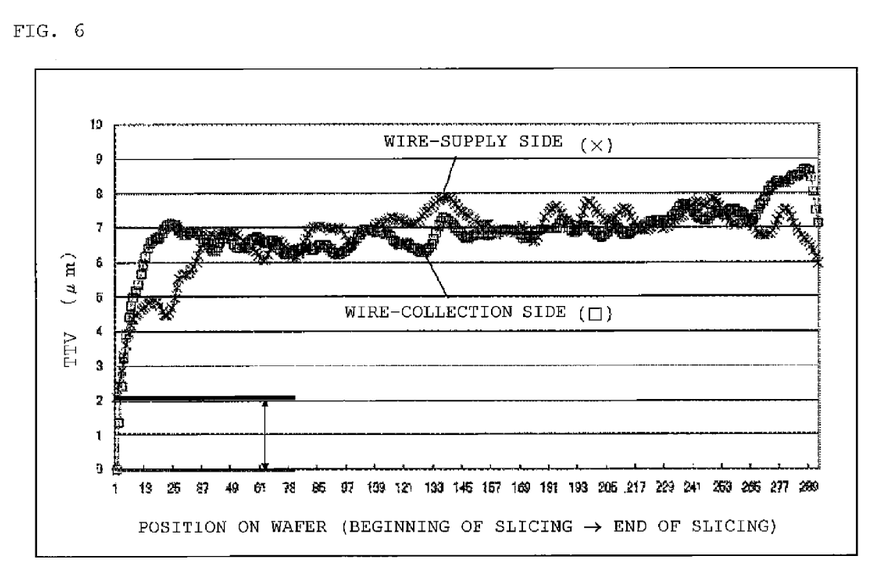
FIG. 6 shows a thickness distribution of a wafer in Comparative Example.

FIG. 6 shows a thickness distribution of a sliced wafer in a slicing direction. As shown in FIG. 6, the difference in thickness at the beginning of slicing between the wire-supply side and the wire-collection side was larger and the thickness at the beginning of slicing on the wire-collection side was thinner than that on the wire-supply side.

FIG. 7 shows a result of the TTV. As shown in FIG. 7, the average of the TTV was 8.7 μm and the variance in the TTV was 2.0 μm, which were considerably worse as compared with the result of Example.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method for slicing a workpiece into wafers by imparting axial reciprocating motion to a wire wound around a plurality of grooved rollers, and moving the workpiece relatively downwardly to press the workpiece against the reciprocating wire and to feed the workpiece with the workpiece cut into while supplying a slurry to the wire, the method comprising the steps of:
   configuring each of the grooved rollers such that a distance from a bottom of grooves of the grooved roller to a rotating shaft of the grooved roller decreases gradually from a wire-supply side, to which the wire is supplied, toward a wire-collection side, to which the wire is collected; and
   slicing the workpiece in such a manner that the workpiece is pressed against the wire on the wire-supply side before the workpiece is pressed against the wire on the wire-collection side while the reciprocating motion of the wire continues as a traveling distance in the wire-collection side is longer than a traveling distance in the wire-supply side, wherein
   in the configuring step, the grooved roller is configured such that the grooved roller has a constant diameter and a depth of the grooves increases gradually from the wire-supply side toward the wire-collection side.

2. The method for slicing a workpiece according to claim 1, wherein
   a maximum difference in the distance from the bottom of grooves of the grooved roller to a rotating shaft of the grooved roller ranges from 1 mm to 5 mm.

* * * * *